United States Patent [19]

Goy Yu Chin et al.

[11] 4,127,948

[45] Dec. 5, 1978

[54] PLAY DESK

[75] Inventors: Manuel Goy Yu Chin, Santa Ana; Derek J. Gay, Rancho Palos Verdes, both of Calif.

[73] Assignee: Mattel, Inc., Hawthorne, Calif.

[21] Appl. No.: 832,416

[22] Filed: Sep. 12, 1977

[51] Int. Cl.² .............................................. G09B 1/06
[52] U.S. Cl. ........................................... 35/60; 35/62
[58] Field of Search .......................... 35/26, 60, 62, 73

[56] References Cited

U.S. PATENT DOCUMENTS

| 115,349 | 5/1871 | Palm | 35/60 |
|---|---|---|---|
| D. 158,527 | 5/1950 | Steele | D25/1 |
| 863,670 | 8/1907 | Summers | 35/60 |
| 1,015,498 | 1/1912 | Kraus | 35/63 |
| 1,406,592 | 2/1922 | Watkins | 35/60 |
| 1,989,216 | 1/1935 | Shaw | 35/60 |
| 2,726,460 | 12/1955 | Jecmen | 35/62 |
| 2,846,783 | 8/1958 | Meythaler | 35/60 |
| 2,883,769 | 4/1959 | Jones | 35/60 |
| 3,000,115 | 9/1961 | Welch | 35/60 |
| 3,263,347 | 8/1966 | McCutcheon | 35/60 |
| 3,336,682 | 8/1967 | Genin | 35/62 |
| 3,592,506 | 7/1971 | Breslow | 35/60 |

Primary Examiner—Harland S. Skogquist
Attorney, Agent, or Firm—John G. Mesaros; Max E. Shirk; Stephen L. King

[57] ABSTRACT

A play desk in the form of an animated character having the main body portion thereof in the form of an openable compartment with a first surface textured to provide a chalk board and the opposing surface having aligned parallel grooves and slots for receiving removable alphanumeric members parallel with the board by engaging the slots or perpendicular to the board by engaging the grooves. Simulated arm members are pivotable for supporting the desk on an incline with either body surface exposed. Simulated leg members are pivotable between a first position for supporting the play desk on a vertical plane or to a second position in line with the lower edge of the body compartment to permit inclining of the desk. A head portion is configured about the periphery for insertion therein or imprinting therein of a face of a character with the peripheral ridge forming a tray. The arm members may be hollow to serve as additional storage.

19 Claims, 13 Drawing Figures

U.S. Patent  Dec. 5, 1978  Sheet 1 of 3  4,127,948
FIG. 1
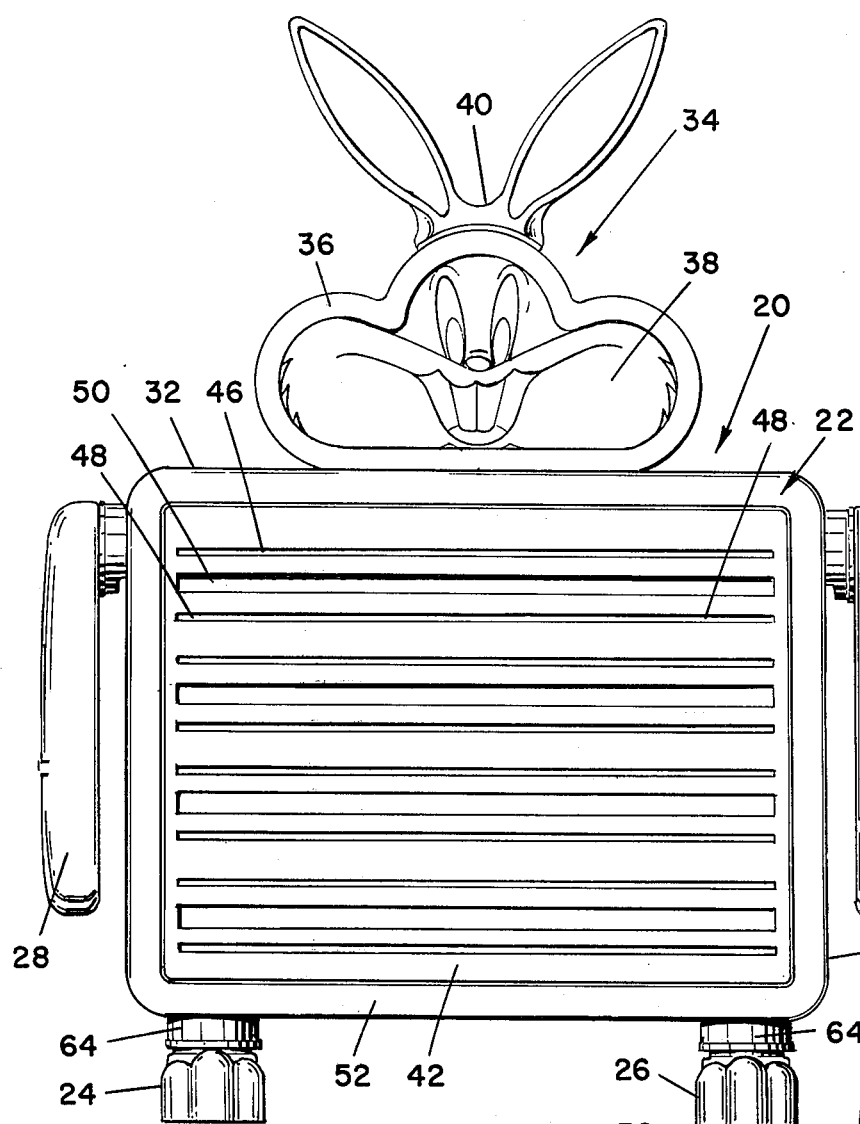
FIG. 2
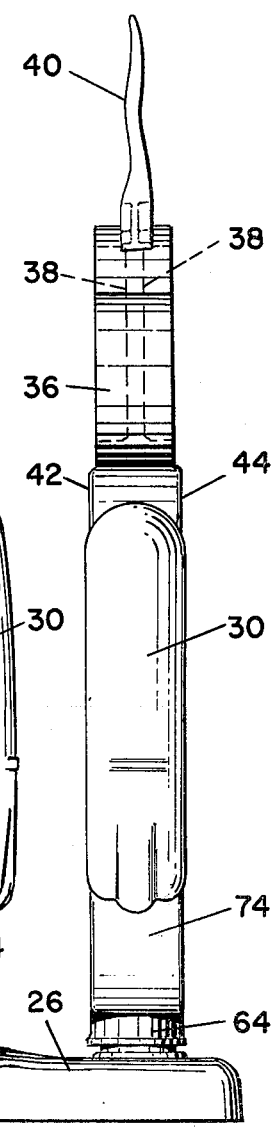
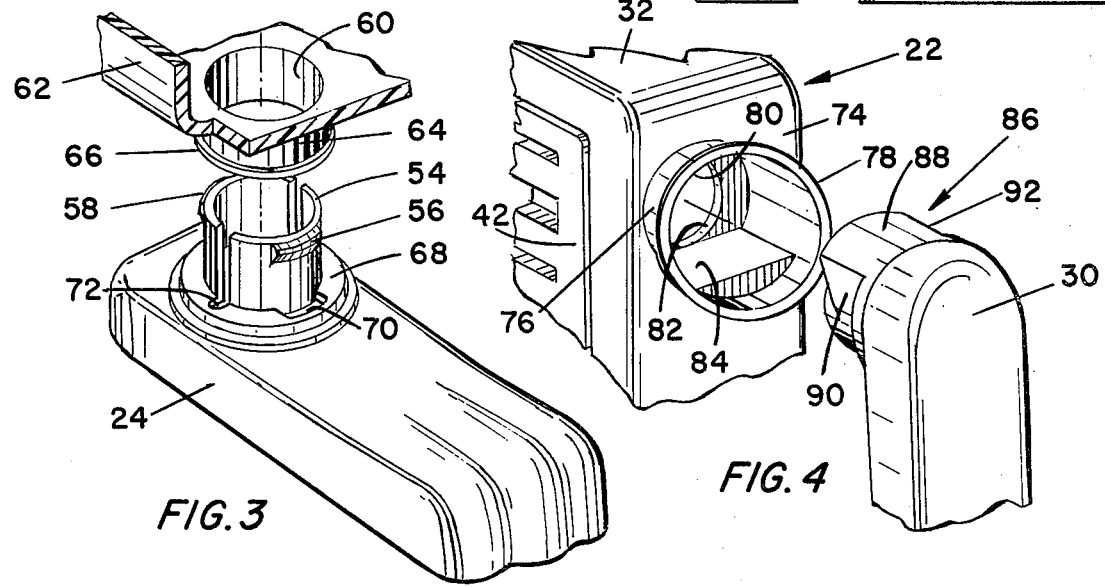
FIG. 3
FIG. 4

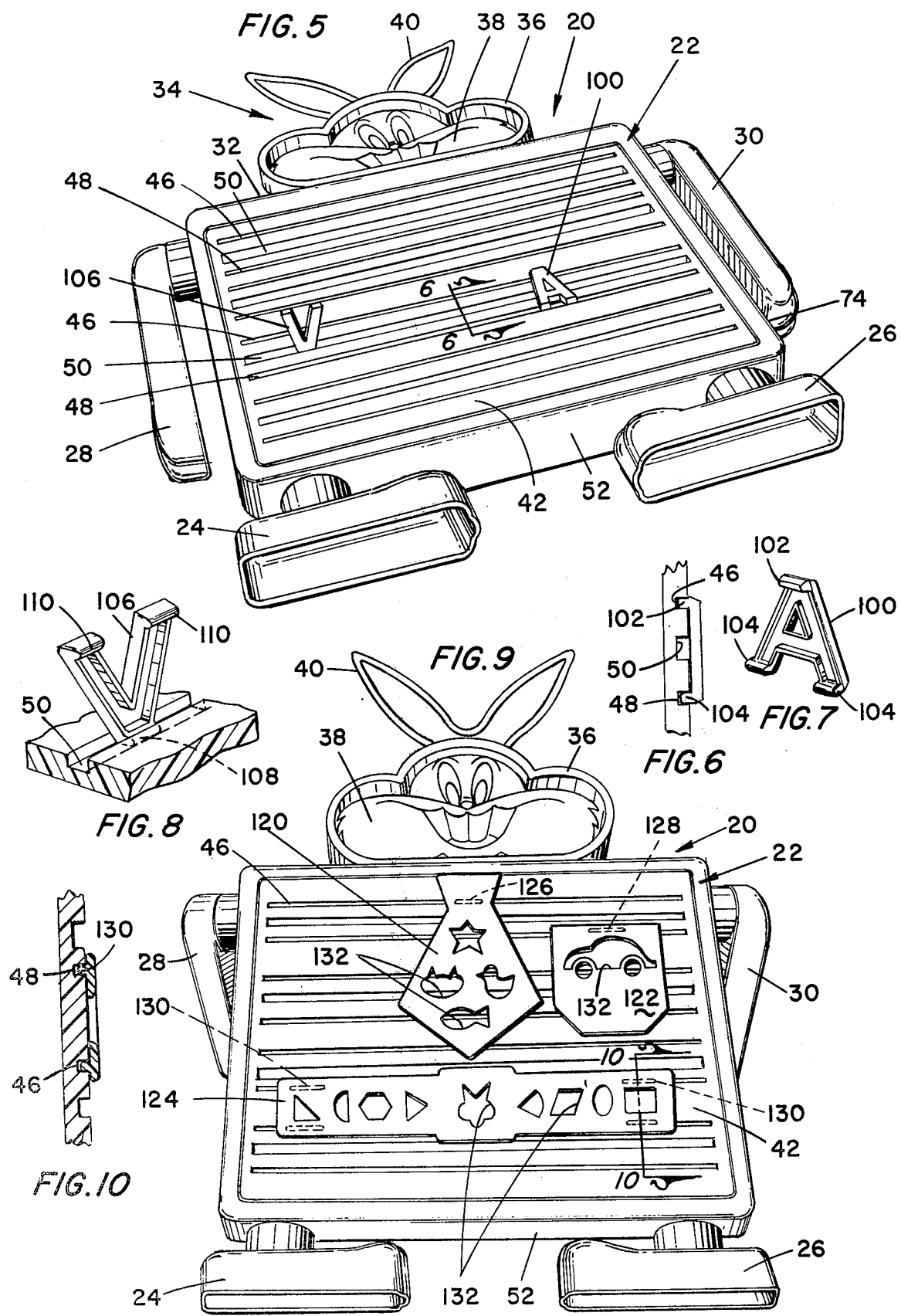

U.S. Patent   Dec. 5, 1978   Sheet 3 of 3   4,127,948
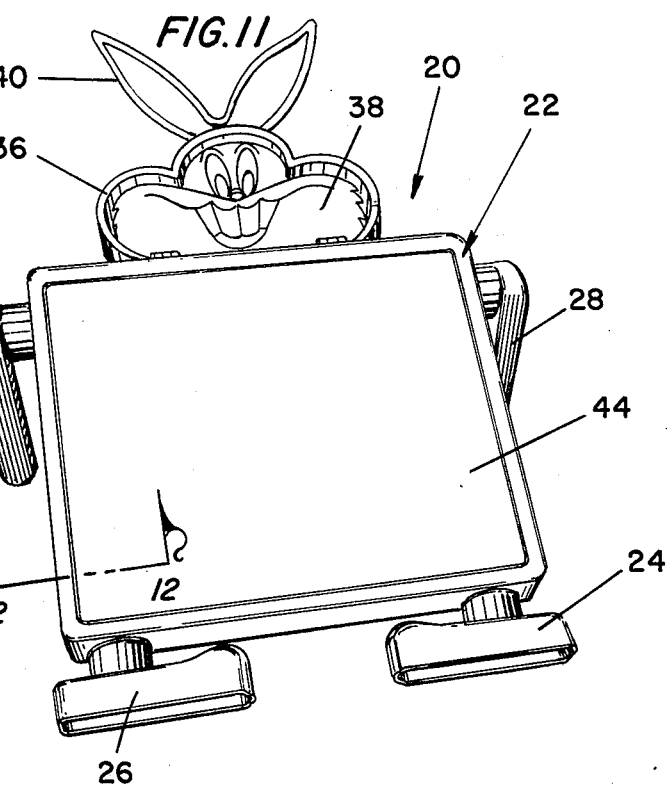
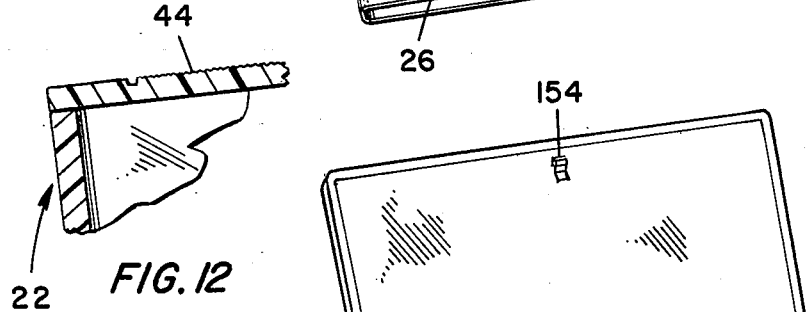
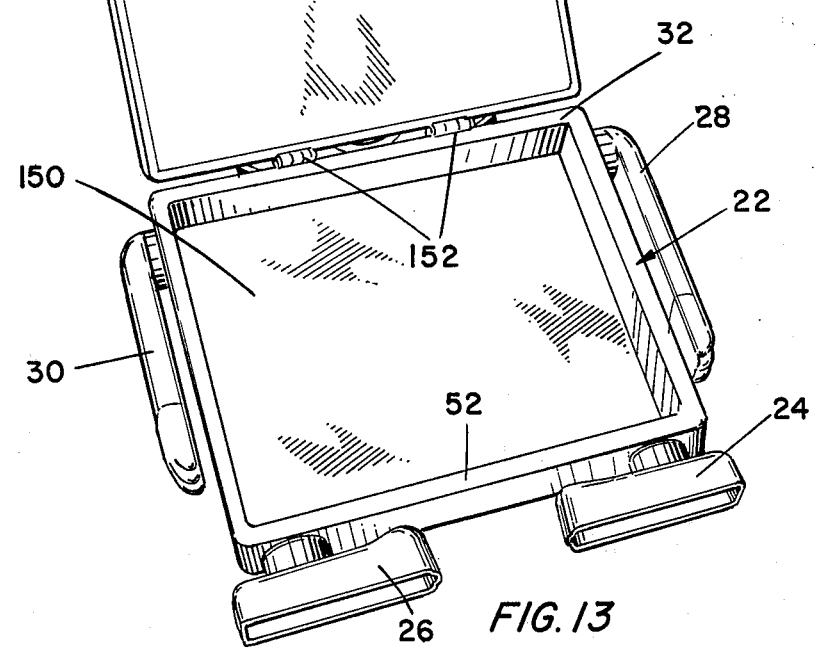

PLAY DESK

BACKGROUND OF THE INVENTION

The background of the invention will be discussed in two parts:

1. Field of the Invention

This invention relates to play desks and more particularly to a multi-positionable play desk in the form of an animated character.

2. Description of the Prior Art

Prior art play desks, such as shown in U.S. Pat. No. 115,349, show a box-like compartment having an openable lid enclosure, the box being supported by a pair of legs. The lid for the enclosure is hinged on two lines and is provided with perforations for detachably receiving letters of the like and is also provided with a blackboard surface.

Other blackboard arrangements for use by children are also shown and described in U.S. Pats. No. 1,015,498; 2,726,460 and 2,883,769. In the latter patent the blackboard is configured in the form of a bench. Other educational board devices are shown in U.S. Pats. No. 1,406,592; 2,846,783 and 3,263,347. Such devices shown and described in the above-referenced U.S. Patents as well as those listed in a separate letter to the Patent Office are generally lacking in play value beyond the immediate use of the device. Additionally, some of the devices which are in the form of a table or a bench are bulky and require floor space. The devices which are generally portable are of the type which would normally be concealed from view in an appropriate storage space, thereby placing them out of the field of view of the child and inhibiting the educational, as well as play value that might otherwise be obtained.

Accordingly, it is an object of this invention to provide a new and improved play desk.

It is another object of this invention to provide a new and improved play desk in the form of an animated character having pivotable arms and legs.

It is a further object of this invention to provide a new and improved play desk having two different play surfaces capable of being supported on a vertical plane, horizontal plane or an inclined plane.

SUMMARY OF THE INVENTION

The foregoing and other objects of the invention are accomplished by providing a play desk in the form of an animated character having a main openable box-like compartment forming the body thereof. Arm members are pivotally supported by the compartment and are movable through a predetermined angle for supporting one of the two play surfaces of the compartment on an inclined plane. A first surface is textured for use as a chalk board and the other surface has grooves and slots for retaining alphanumeric members, the alphanumeric members being retained in a horizontal position on the surface by matingly engaging the slots and being retained in a position perpendicular to the surface by insertion into the grooves. A pair of foot members are pivotally secured to the lower edge of the compartment and are pivotable, one position of the foot members in general alignment with the edge of the compartment permitting the compartment to be disposed angularly or horizontally on another surface; a second position permitting the foot members to extend generally perpendicular to the plane of the surface for supporting a play desk in a vertical plane. A head member is provided, the head member having a peripheral ridge defining the head contour with a generally planar member therein having attached thereto or imprinted thereon a facial representation of the animated character. The peripheral ridge of the head member provides an article holding tray for the play desk. The arms and feet can be made hollow and separable for additional storage. One of the play surfaces is hinged to provide access to inner compartment.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a front elevational view of the play desk in a vertical position;

FIG. 2 is a side elevational view of the play desk of FIG. 1;

FIG. 3 is an exploded perspective view of a foot member assembly used in the play desk of FIG. 1;

FIG. 4 is an exploded perspective view showing the shoulder joint for the arm assembly of the play desk of FIG. 1;

FIG. 5 is a perspective view of the play desk of FIG. 1 in a horizontal position;

FIG. 6 is a cross-sectional view taken along line 6—6 of FIG. 5;

FIG. 7 is a rear perspective view of an alphanumeric member utilized with the play desk;

FIG. 8 is an enlarged partial perspective view illustrating an alphanumeric member engaging the groove of a play surface;

FIG. 9 is front elevational view of the play desk of FIG. 1 supported in an incline position with templates mounted thereon;

FIG. 10 is a cross-sectional view taken along line 10—10 of FIG. 9;

FIG. 11 is a perspective view of the play desk of FIG. 1 supported on an inclined plane and turned over to depict the other work surface;

FIG. 12 is a partial cross-sectional view taken along line 12—12 of FIG. 11; and FIG. 13 is a perspective view of the play desk in a horizontal position with the lid thereof opened.

DESCRIPTION OF THE PREFERRED EMBODIMENT

Referring now to the drawings and particularly to FIGS. 1 and 2 there is shown a play desk, generally designated 20 in the form of an animated character, the play desk 20 having a main body portion compartment 22, a pair of downwardly depending foot members 24 and 26 and a pair of pivotable arm members 28 and 30, the arm members 28 and 30 being pivotally supported by the compartment 22 on aligned independent axes adjacent the upper edge or "shoulders" of the main body compartment 22. Centrally disposed with respect to the upper edge 32 of the body 22 is an upwardly extending head member generally designated 34, the head member 34 having a peripheral ridge 36 contoured to simulate the head of a given character such as a rabbit or bunny, the face 38 of which is suitably formed, imprinted or applied within the confines of the ridge 36. Upwardly extending from the top of the head member 34 is a rabbit ear insert 40 which is suitably affixed to or inserted into the ridge 36 of the head member 34.

The face 38, as shown in dotted lines in FIG. 2, in the illustrated embodiment is a planar surface centrally disposed with respect to the peripheral ridge 36 defining the outer contour of the head member 34. As will hereinafter be discussed, the body compartment 22 has a first play surface 42 on one surface thereof with a second play surface 44 on the opposite surface thereof. The play desk 20 is adapted to be positioned with the play surfaces 42 and 44 disposed in many positions, such as vertical as illustrated, horizontally by resting on a supporting surface or at an angle suitably supported as will hereinafter be discussed. When the play desk 20 is disposed horizontally or angularly, the peripheral ridge 36 of the head member 34 in conjunction with the planar member of the face 38 forms a tray which can be utilized to accomodate various articles such as chalk, letters, numbers, crayons or other similar articles which can be utilized with the play desk 20.

The main body compartment 22 has a generally quadrangular or box-like periphery with the play surfaces 42 and 44 in the illustrated embodiment being parallel to each other and as will hereinafter be discussed, one of the play surfaces is suitably hinged to the edge of the compartment 22 for opening thereof to permit the play articles used therewith to be stored therein. The play surface 22 has a plurality of aligned parallel slots, one pair of which are designated by the reference numerals 46 and 48, there being an intervening parallel groove 50 of greater width substantially mid-way between the slots 46 and 48. The purpose of the slots 46 and 48 and the grove 50 as will hereinafter be discussed, is to removably retain alphanumeric members such as letters, numbers or the like. The slots are also used to retain templates, the periphery of which are decoratively configured to simulate articles of clothing.

Referrring also to FIG. 3, the foot members 24 and 26 are pivotally attached in downwardly depending fashion to the lower edge 52 of the compartment 22 adjacent opposite outer edges thereof. The foot members 24 and 26 have a width generally equal to the width of the edge 52 of the body compartment 22 and a length sufficient to support the play desk 20 in a vertical position when the foot members 24 and 26 are pivoted at an angle generally perpendicular to the plane of either of the play surfaces 42 and 44. The foot member 24 designated in FIG. 3 is provided with a generally perpendicular upwardly extending split sleeve 54 integral therewith, the sleeve 54 having a pair of outwardly extending diametrically opposed wedge-shaped projections 56 and 58. The sleeve 54 is insertible through a matingly configured aperture 60 formed integral with a foot-supporting member 62 which is secured to the lower edge 52 of the body compartment 22 adjacent the edge thereof. The aperture 60 is provided with a downwardly extending tube portion 64 with an enlarged peripheral flange 66 at the lower edge thereof for abuttingly engaging a mating bearing surface 68 formed in foot member 24 about the periphery of the lower edge of sleeve 54. The bearing surface 68 is provided with suitable detents 70 and 72 which are engagable by ribs (not shown) in the coacting surface of flange 66, the ribs and detents being configured to provide certain fixed angular positions of the foot member 24 with respect to the edge 52 of body compartment 22. These fixed detent positions generally correspond to the foot member 24 being parallel with the edge 52 and a second position with the foot member 24 perpendicular to the edge 52 as illustrated in FIG. 2.

The foot member 24 is inserted into the foot-supporting member 62 by suitably depressing the sleeve 54 into the aperture 60 until the opposing wedge-shaped projections 56 and 58 clear the upper periphery of aperture 60 thereby retaining the foot member 24 within the foot connecting member 62. During this insertion, the two portions of the sleeve 54 will be resiliently deformed toward each other with the natural bias being outwardly for retention purposes. The overall length of tubular portion 64 is such that a close abutting and coacting relationship exists between the lower edge of flange 66 and the bearing surface 68 to permit detenting within the detents 70 and 72 under the natural axial compression of this construction.

Referring now to FIG. 4, the details pertaining to the assembly of the arm member to the main body compartment 22 will now be discussed. Perpendicular to the upper horizontal edge 32 of the body compartment 22 is a downwardly extending edge 74 which has secured thereto an outwardly extending tubular portion 76 terminating in an enlarged flanged bearing surface 78 thus forming a bearing aperture 80 therein. The axis of the bearing aperture 80 extends generally parallel to the upper edge 32. The downwardly extending edge 74 to which the tubular portion 76 is secured has a second aperture 82 coaxial with bearing aperture 80, suitably fastening means being inserted in the opposite side of edge 74 for retaining the arm member 30. The lower portion of bearing aperture 80 is provided with an arcuate segment 84 formed integrally therein, the arcuate segment 84 having a planar upper surface adapted to coact with a mating surface of a wedge 86 formed generally perpendicular to the upper edge of arm 30. The wedge 86 is provided with an arcuate upper surface 88 having the same radius as the bearing aperture 80 and is also provided with angularly disposed planar surfaces 90 and 92 which traverse an angle of approximately 25°, the surfaces 90 and 92 being adapted to engage the planar portion of the arcuate segment 84 within bearing aperture 80 to permit rotation through an angle of 25° on either side of a line extending to the longitudinal axis of arm 30 when in the position depicted in FIG. 2. The wedge-shaped member 86 is inserted within bearing aperture 80 and suitably secured from the opposite side by means such as a broad faced screw or the like. The arm 30 is then free to pivot through an angle of approximately 50° to suitably support either of the play surfaces 42 and 44 at an angle.

Referring now to FIGS. 5-8, the details pertaining to the first play surface 42 will be discussed. The play desk 20 as shown in FIG. 5 is depicted in a horizontal position, that is suitably supported on a surface such as a table or the like with the play surface 42 being likewise generally horizontal. The play surface 42 includes a plurality of sets of depressions extending horizontally and generally parallel to the upper and lower edges 32 and 52, respectively, each set of depressions including spaced parallel slots 46 and 48 with an intervening generally mid-way groove 50 having a width greater than the slots 46 and 48 which have approximately the same width. An alphanumeric member such as a letter 100 in the form of an "A" is disposed horizontally with respect to the play surface 42. As shown in FIG. 7, the rearward surface of the alphanumeric member 100 is provided with spaced slot engaging projections 102 at the apex of the "A" with projections 104 extendings from the legs thereof, the projections 102 and 104 being generally perpendicular to the main plane of the alphanumeric member 100. The slot engagement is depicted in cross section in FIG. 6 with the upper projection 102 being generally configured for mating frictional engagement within the upper slot 46 while the lower projections 104 fit within the spaced slot 48 of that set of depressions. While the projections 104 may also frictionally engage the slot 48, the projections 104 may merely be stabilizing projections to permit the proper alignment of the alphanumeric members on a given set of depressions. As also can be seen in FIG. 6, the alphanumeric member 100 has a length sufficient to straddle the intermediate groove 50.

Correspondingly, a second alphanumeric member 106 in the shape of a "V" is shown in FIGS. 5 and 8 engaging the intermediate groove 50 for alignment in a direction perpendicular to the plane of the play surface 42. As shown in FIG. 8, the alphanumeric member 106 has a first projection 108 at the apex of the lower edge thereof with inwardly extending similar projections 110 extending perpendicular to the upper free ends of the member. The projection 108 (and correspondingly projections 104 of member 100) are of a sufficient length when included with the overall depth of the alphanumeric member 106 for frictional retention within the groove 50 of the play surface 42. Each of the alphanumeric members, as well as other simulated characters such as animals or the like, if desired, will correspondingly be provided with projections engagable within one or both of the parallel slots 46 and 48, and correspondingly such members have an overall depth including the projections to render them capable of being inserted within the groove 50 for positioning in a position perpendicular to the plane of the surface 42. Although alphanumeric characters are illustrated, the invention need not be so limited and can include fanciful symmetrical configurations or animal configurations or such other educational and amusement configurations. Each set of depressions extends generally the full width of the play surface 42 within the boundaries of the body member 22 and contains a sufficient amount of space that a child can use the letters or other alphanumeric members to form simple sentences or words and can further utilize the entire play surface 42, if desired, to create a sign or four (or more) lines for display purposes when the play desk 20 is stored on a shelf or the like in a room in open display in the vertical position depicted in FIGS. 1 and 2.

Additionally, as illustrated in FIGS. 9 and 10, members other than alphanumeric members are utilized with the play surface 42, the members so-utilized being configured to simulate articles of clothing. As illustrated in FIG. 9, the play desk 20 is shown with the play surface 22 thereof at an angle to a supporting surface such as a table top of the like, the inclination being accomplished by rotation of the arm members 28 and 30 to a stop position (as previously discussed in connection with FIG. 4) with the foot members 24 and 26 thereof pivoted inwardly until the longitudinal axes of the foot members are generally in alignment with each other and parallel to the lower edge 52 of the main body compartment 22. Displayed on the play surface 42 are templates 120, 122 and 124, the template 120 being configured to simulate a necktie; the template 122 being configured to simulate a patch pocket; and the template 124 being configured to simulate a belt. Each of the templates 120, 122, and 124 is provided with cutout portions in the form of geometric configurations, automobiles, animals or fish to be used as tracing guides for a child while playing with the same.

The template 120 is provided with an elongate projection 126 (shown in dotted lines) centrally disposed adjacent the upper edge therof for matingly engaging a slot 46. Similarly, the template 122 is provided with an elongate projection 128 (shown in dotted lines) on the rear surface of the upper edge thereof. The template 124 in the shape of a belt is provided with a pair of aligned projections 130 (shown in dotted lines) correspondingly adapted for engaging one of the slots 46 or 48. As shown in FIG. 10, the projection 130 fits within a recess or slot 48 which is the lower depression of one of the sets of depressions, this position being arbitrary and selected for aesthetic appearance as shown in FIG. 9. When the templates are utilized to make tracings through the cutouts 132 (only a few of which are designated), the template is placed with the surface viewed in FIG. 9 on the paper or other surface on which the outline tracing is to be made. In this manner, the surface of the template is flush with the surface on which the drawing is to be made and the projections 126, 128 or 130 are extending toward the child and serve an additional purpose in assisting the child to position the template with respect to the paper or other surface and also assist in the lifting of the template from the paper or other surface. It is also to be emphasized in FIG. 9 as well as FIG. 5, when the play desk 20 is placed in the horizontal or inclined position the peripheral ridge 36 surrounding the planar base 38 forms a tray in which alphanumeric members or other articles not currently in use, can be placed for temporary storage.

Referring now to FIGS. 11-13, the play desk 20 is illustrated with reverse play surface 44 positioned for use by the child, the play surface 44 being formed of a textured styrene material that can be utilized as a chalkboard or crayon board by the child. As shown in FIG. 11, the play desk 20 is illustrated in an inclined position with the arm members 28 and 30 pivoted to a full stop position opposite to the stop position thereof for positioning the play desk 20 as illustrated in FIG. 9. The degree of pivoting between the two FIGS. 9 and 11 is approximately 50° from one extreme position to the other. Also, as shown in FIG. 11, the reverse surface of the face 38 outlined by the peripheral ridge 36 contains suitably imprinted thereon or affixed thereto an animated face identical to that on the opposite surface with the ridge 36 forming a tray for receipt of articles utilized with the play surface 44, such articles including for example, crayons, chalk, an erasure or a damp cloth. The textured surface of the play surface 44 is illustrated in an enlargement in FIG. 12.

As shown in FIG. 13, the play surface 44 is formed as a planar lid member suitably hinged to the edge 32 of the main body compartment 22 to form a compartment 150 therein for the storage of all articles used with the play desk 20 but not otherwise displayed. The hinges 152 are suitably attached to render the inner surface of the lid or play surface 44 flush with the edges of the main body compartment 22 and suitable latch means 154 are centrally disposed with respect to the edge of play surface 44 opposite the hinges 152 for suitable engagement with a recess or the like formed on the interior of the lower edge 52 of the main body compartment 22. Although not illustrated, the arms 28 and 30 which are hollow may be formed for separation to provide additional storage space therein. It is to be understood that although the main body compartment 22 is shown as having the peripheral edges thereof perpendicular to the plane of the play surfaces 42 and 44 and configured to form a rectangular box-like opening or compartment, the main body portion may have other configurations consistent with the animated character to be simulated by the play desk. Additionally, although the chalkboard play surface 44 is shown as being the hinged lid member, it is to be understood that the opposite play surface can be hinged instead and further the compartment 150 within the main body compartment 22 can have dividers or separators to partition the storage area. While there has been shown and described a preferred embodiment, it is to be understood that various other adaptations and modifications may be made within the spirit and scope of the invention.

What is claimed is:

1. In a positionable play desk, the combination comprising:
   a main body member having first and second play surfaces on opposite sides thereof;
   first and second arm members pivotally secured adjacent opposite sides of one edge of said body member;
   support members pivotally secured to the edge of said body member opposite said one edge, said support members being positional for supporting said body member in a vertical position on a supporting surface; and
   a head member secured to said body member generally centrally with respect to said one edge, said body member, said arm members, said support members and said head member being configured to simulate a character.

2. The combination according to claim 1 wherein said arm members are pivotable to any position between a first stop position and a second stop position, said first stop position supporting said first play surface on a supporting surface at an angle thereto, and said second stop position supporting said second play surface on a supporting surface at an angle thereto.

3. The combination according to claim 2 wherein said support members are simulated foot members having a width generally equal to the width of said body member and a length sufficient to support said play desk in a vertical position, said foot members being pivotable into alignment for supporting said play desk at an angle and pivotable into parallel relationship to support said body member in a generally vertical position.

4. The combination according to claim 3 wherein said body member is an openable compartment and one of said first and second play surfaces is a hinged lid.

5. The combination according to claim 4 wherein said first play surface is a textured surface for use as a chalkboard.

6. The combination according to claim 5 wherein said second play surface has sets of depressions formed therein for releasably receiving other members.

7. The combination according to claim 6 wherein said other members are character members.

8. The combination according to claim 7 wherein each of said sets of depressions includes parallel slots and said other members include projection means for engaging at least one of said slots.

9. The combination according to claim 8 wherein at least one of said sets of depressions includes groove means in parallel relation and between said parallel slots and said other members include a portion engagable within said groove for maintaining said other members in a position generally perpendicular to the plane of said second play surface.

10. The combination according to claim 9 wherein said openable compartment is box-like and said first and second play surfaces are generally planar and parallel.

11. The combination according to claim 10 wherein said head member includes a peripheral ridge configured to the outline of the character and the face of the character appears on both sides of a planar member transverse to and intermediate opposite edges of said ridge whereby to form first and second tray members for use with said first and second play surfaces.

12. In a play desk, the combination comprising:
   a main body member having at least one play surface;
   a plurality of pairs of parallel slots formed in said play surface;
   groove means in said play surface in parallel relation with said parallel slots; and
   other members, each of said members having spaced first and second projection means thereon for engaging said parallel slots to support said member in generally parallel relation with said play surface, at least one of said projection means being positioned and configured for engaging said groove means to support said member in a direction generally perpendicular to said play surface.

13. The combination according to claim 12 within said play surface is generally planar and said groove means is a groove intermediate said parallel slots and generally coextensive with the length of said parallel slots.

14. The combination according to claim 13 wherein said play surface includes a plurality of sets of parallel slots.

15. The combination according to claim 14 wherein each set of parallel slots include a groove therebetween.

16. The combination according to claim 15 wherein said body member is a generally box-like openable compartment including a second play surface generally parallel to said first play surface.

17. The combination according to claim 16 wherein said main body member has first means pivotable between two positions for supporting said body member at an angle to a supporting surface.

18. The combination according to claim 17 wherein said body member includes second means for supporting said body member in a vertical position.

19. The combination according to claim 18 wherein said first means are arm members and said second means are pivotable foot members.

* * * * *